US00RE41588E

(19) United States
(12) Reissued Patent
Santhanam et al.

(10) Patent Number: US RE41,588 E
(45) Date of Reissued Patent: Aug. 24, 2010

(54) RHEOLOGICAL ADDITIVES AND PAINT AND COATING COMPOSITIONS CONTAINING SUCH ADDITIVES EXHIBITING IMPROVED INTERCOAT ADHESION

(75) Inventors: Mahalingam Santhanam, Plainsboro, NJ (US); Wilbur S. Mardis, Southampton, PA (US)

(73) Assignee: Elementis Specialties, Inc., Hightstown, NJ (US)

(21) Appl. No.: 10/936,831

(22) Filed: Sep. 9, 2004

Related U.S. Patent Documents

Reissue of:
(64) Patent No.: 6,448,366
Issued: Sep. 10, 2002
Appl. No.: 09/589,166
Filed: Jun. 8, 2000

(51) Int. Cl.
*C08G 63/44* (2006.01)
*C09D 4/00* (2006.01)
*C07C 231/02* (2006.01)

(52) U.S. Cl. ..... 528/288; 106/244; 524/241; 524/247; 554/35

(58) Field of Classification Search ..... 106/244; 524/241, 247; 528/288; 554/35
See application file for complete search history.

(56) References Cited

U.S. PATENT DOCUMENTS 4,127,512 A * 11/1978 Heyden et al. ..... 510/276
5,034,444 A * 7/1991 Yun et al. ..... 524/223

FOREIGN PATENT DOCUMENTS

JP 60-44352 10/1985
JP 96-26257 * 3/1987
JP 63-235381 9/1988

* cited by examiner

*Primary Examiner*—Edward J Cain
(74) *Attorney, Agent, or Firm*—Morgan, Lewis & Bockius LLP

(57) ABSTRACT

An improved thickening composition for organic systems, including paints and coatings, is described. The additive provides paints and coatings more than adequate viscosity improvement without affecting intercoat adhesion characteristics.

REEXAMINATION RESULTS

The questions raised in reexamination request no. 90/007130, filed Jul. 21, 2004, have been considered and the results thereof are reflected in this reissue patent which constitutes the reexamination certificate required by 35 U. S. C. 307 as provided in 37 CFR 1.570(e), for *ex parte* reexamination, or the reexamination certificate required by 35 U. S. C. 316 as provided in 37 CFR 1.997(e) for *inter partes* reexamination.

4 Claims, No Drawings

RHEOLOGICAL ADDITIVES AND PAINT AND COATING COMPOSITIONS CONTAINING SUCH ADDITIVES EXHIBITING IMPROVED INTERCOAT ADHESION

Matter enclosed in heavy brackets [ ] appears in the original patent but forms no part of this reissue specification; matter printed in italics indicates the additions made by reissue.

BACKGROUND OF THE INVENTION

1. Brief Description of the Invention

The invention described herein involves improved thickening compositions often referred to as Theological additives, viscosity modifiers or thixotropes, used to impart rheological and viscosity modification properties to a wide range of oil and organic based systems used as paints and coatings. In many commercial applications, such a thickening Theological chemical is added to an oil or organic based paint or coating system, for example epoxy paint, to change or modify the rheological properties of the system. The invention also includes paints and coatings containing such additives.

In an important aspect the invention covers a Theological additive consisting of the reaction product of:

a) a diamine selected from the group consisting of ethylene diamine and hexamethylene diamine;

b) one or more straight chain monocarboxylic acids having 4 to 8 carbon atoms; and c) 12-hydroxystearic acid.

The invention is based on a discovery that certain castor based rheological additives, while imparting desirable rheology, impair recoatability and intercoat adhesion of the system in which they are utilized where such systems, after driving, is painted or coated over with a second paint or coating composition. The present invention shows that these undesirable side effects can be avoided by using the inventive additives.

Normally Theological additives should show no reactivity, so they do not react with any other ingredients in the systems in which they are used. Intercoat adhesion is defined as adhesion between adjacent layers of paint when more than one coat of paint or coating is applied to a substrate. Examples of such use are primer and topcoats in home painting and a series of paint coatings applied to automobiles and appliances.

We have concluded it is essential when using additives to structure their chemistry so that, at necessary dosage, they do not adversely affect paint and coating compositions used by customers in systems where more than one coat will be applied to a substrate.

2. Description of the Prior Art

It has been known in the art for many years to use various materials as rheological additives to, among other Theological properties, modify the viscosity of organic systems. Such systems can include paints and coatings, inks, construction materials and wood stains. Depending on the composition of the system, the products made with these thickeners are preferably useful as coatings and paints.

The present invention includes novel rheological additives as well as organic fluid composition containing such additives.

Rheology is defined as the science of the flow and deformation of matter. Rheological additives can be defined as substances added to liquid systems which change that system's flow and viscosity properties. Proper rheology for storage and application must be balanced with the requirement of many fluid systems to resist sagging and dripping during and following application. The term "thixotropy" describes a type of flow behavior in which a temporary reduction in a fluid's viscosity by the application of shear, such as through the use of a paintbrush or atomizing equipment; once the shear forces have been removed, such as following deposition of the liquid onto a surface), the system will regain its initial, higher viscosity.

For background, Japanese Patent Application No. 62-69957 describes a sag preventor for non-aqueous coating materials comprising a mixture of two different fatty acid amides wherein fatty acid amide (A) is obtained by reacting a mixture of at least one straight chain saturated fatty acid having 3–4 carbon atoms and 12-hydroxystearic acid (the molar ratio of the fatty acid and 12-hydroxystearic acid being 1:9–8:1) and ethylene diamine or hexamethylene diamine and fatty acid amide (B) is obtained by reacting a mixture of at least one straight chain saturated fatty acid having 6–22 carbon atoms and 12-hydroxystearic acid (the molar ratio of the fatty acid and 12-hydroxystearic acid being 0:10–8:2) and ethylene diamine, hexamethylene diamine, or xylyiene diamine wherein the weight ratio of fatty acid amide (A) to fatty acid amide (B) is 100:00–20:80.

Products believed to be the reaction product of ethylene diamine, a monocarboxylic acid having ten carbon atoms and 12-hydroxystearic acid have been sold for many years as Theological additives. A product, designated comparative X, using this chemistry has been used as a comparative example to the invention hereof in the below following examples.

OBJECT OF THE INVENTION

It is an object of the present invention to solve or substantially alleviate the problems created by prior art thickeners in thickening compositions for organic systems. It is, therefore, a more specific object of the present invention to an additive which will provide paints and coatings without affecting intercoat adhesion.

DESCRIPTION OF THE PREFERRED EMBODIMENTS

This invention provides amide compositions having at least two amide moieties per molecule which comprises reacting preferably by known condensation reactions, a diamine selected from ethylene diamine, hexamethylene and mixtures thereof diamine and mixtures thereof, one or more monocarboxylic acid of the formula:

$$R_1—COOH$$

wherein $R_1$ is a straight chain saturated aliphatic hydrocarbon radical of 3 to 7 carbon atoms and 12-hydroxystearic acid. The inventors have found that the inventive composition provides improved rheological and suspension properties to non-aqueous coating systems and more importantly the inventive composition does not cause intercoat adhesion failures of topcoats subsequently applied to primers.

In an important aspect the invention covers a rheological additive consisting of the reaction product of:

a) a diamine selected from the group consisting of ethylene diamine and hexamethylene diamine;

b) one or more straight chain monocarboxylic acids having 3 to 7 carbon atoms in the straight chain saturated aliphatic hydrocarbon radical; and c) 12-hydroxystearic acid.

The invention preferably relates to a composition, which is obtained by reacting a) 2 equivalents of a chemical selected from ethylene diamine, hexamethylene diamine and mixtures thereof;

b) from 0.4 to 1.8 equivalents of a straight chain monocarboxylic acid having 3 to 7 carbon atoms in the straight chain saturated aliphatic hydrocarbon radical; and c) from 1.6 to 0.2 equivalents of 12-hydroxystearic acid, such that no essentially free acid and amine is left unreacted at the end of the condensation reaction.

A most preferably aspect of this invention relates to a rheological additive composition consisting of a reaction product of:

1) ethylene diamine;

2) one or more straight chain monocarboxylic acids having 3–7 carbon atoms in the straight chain saturated aliphatic hydrocarbon radical; and 3) 12-hydroxystearic acid.

wherein the equivalent ratio of monocarboxylic acid and 12-hydroxystearic acid is 0.4:1.6 to 1.8:0.2 and there are 2 equivalents of ethylene diamine.

The term "equivalent(s)" is used and is intended to have its standard meaning as employed in the art (see for example Hawley's Condensed Chemical Dictionary 1987, $11^{th}$ Edition). However, for additional clarity, equivalents refer to the number of reactive groups present in a molar quantity of a molecule, such that a mole of a diamine (e.g. ethylene diamine) has two equivalents of amine and a mole of 12-hydroxystearic acid has one equivalent of carboxylic acid. Furthermore a monoacid has only one reactive group and a diamine has only two reactive groups (preferably both primary amines), and a monocarboxylic acid has one carboxylic acid group and these are preferable, although not necessarily, the only reactive materials present in the reaction mixture.

The diamines of component a) useful for the present invention include ethylene diamine and hexamethylene diamine with the most preferred being ethylene diamine. Hexamethylene diamine is often referred to as hexane diamine. These are common chemicals and can be obtained from a large number of chemical manufacturers.

The chemicals useful for component b) include monocarboxylic acids of the formula $R_1$—COOH were $R_1$ is between 3 and 7. Such acids are commercially available and include butyric acid, pentanoic acid, hexanoic acid, heptanoic acid and octanoic acid. The monocarboxylic acid of the formula $R_1$—COOH wherein $R_1$ is $C_8$ and above falls outside the preferred acids. A preferred acid is heptanoic acid with the most preferred hexanoic acid. These acids are commercially available for example from Acme Hardesty Company, Penta Manufacturing Company and Procter and Gamble Company and others.

Component (c) is 12-hydroxystearic acid. This acid is produced from hydrogenated castor oil and is a straight $C_{18}$ carbon chain saturated fatty acid with an OH group attached to the $12^{th}$ carbon atom. Suppliers of such products include, for example, CASCHEM, Inc and Acme-Hardesty Company.

Generally the Theological additives of the present invention are preferably prepared according to known condensation reaction. The diamine, monocarboxylic acid and 12-hydroxystearic acid are reacted together in stoichiometric amounts so that no excess of the acid or the amine is left unreacted. The order of the addition of the co-reactants is not generally important and these can be added either at ambient temperature or at reaction temperature. For example, the reactants may be charged in increments to a suitable reaction vessel equipped with a mechanical stirrer, a thermometer, a Dean-Stark adapter or other water collector and a nitrogen inlet. The vessel containing the reactants is heated under a blanket of nitrogen. The reaction may be carried out under atmospheric pressure or under vacuum. The reaction temperature to be used in the synthesis may be varied, but preferably ranges from ambient temperature to 300° C. under normal pressure. More preferably, the temperature ranges from ambient to 250° C., and most preferably from 120 to 220° C. Water is removed as condensate as the reaction progresses. After the completion of the reaction, the additive is cooled to 140–150° C. and discharged into a release box and allowed to cool overnight. The product is then cooled with liquid nitrogen, dried and ground cryogenically to a fine powder using a Brinkmann centrifugal mill.

The rheological additives used in the present invention may be synthesized with or without a catalyst. The catalyst, if used, may be selected from those, which are normally used for condensation reactions. Examples of such catalysts include, but are not limited to, sulfuric acid, orthophosphoric acid, p-toluene sulfonic acid, dibutytin dilaurate, tetraalkyl tin or titanium compounds, metal hydrides and the like. A preferred catalyst is orthophosphoric acid. The catalyst should generally be used in an amount of from about 0.001 to 2.5 percent by weight based on the total weight of the reactants.

Inventive paints and coatings can be prepared using present standard and diverse paint and coatings base formulations by merely replacing existing Theological additives with the inventive additives described above. Amounts of additives used are normally between 0.5 to 3.5% of the base formulation. Alkyd enamel paints, air drying alkyd paints, long oil alkyd baking paints, two-pack epoxy polyamide primer paints and pvc topcoats are preferred paint coating systems.

EXAMPLES

The following examples are illustrations designed to assist those skilled in the art to practice the present invention, but are not intended to limit the invention. Changes can be made without departing from the spirit of the invention. The various chemicals used in the examples were commercially obtained materials.

Example 1

A number of additives were made using the teaching of this invention as follows.

To a 500-ml resin kettle equipped with a thermometer, a Dean-Stark adapter, a water-cooled condenser, a mechanical stirrer and a nitrogen inlet, 25.84 grams (0.43 mole, 0.86 equivalents) ethylene diamine, 49.95 grams (0.43 mole, 0.43 equivalents) hexanoic acid, 132.75 grams (0.43 mole, 0.43 equivalents) 12-hydroxystearic acid and 0.04 gram phosporic acid as catalyst were charged. The mixture was heated to 200° C. with stirring under a blanket of nitrogen with a steady flow of the inert gas. Water start to come off at 150°–155° C. After an hour at 200° C., aliquots are taken hourly and the acid and amine values are determined. The reaction is continued until the acid and amine values are below 10. The reaction product is cooled to 120° C. and is dischaged into a release box and allowed to cool to room temperature. The product is then cooled under liquid nitrogen and ground cryogenically to a fine powder using a Brinkmann centrifugal mill.

Examples 2–31

The general procedure outlined in Example 1 was used, except that the reacts we replaced as indicated in Table 1.

TABLE 1

| Example | Reagents | Moles | Equivalents |
|---|---|---|---|
| 2 | Ethylene diamine | 0.43 | 0.86 |
| | Hexanoic acid | 0.473 | 0.473 |
| | 12-Hydroxystearic acid | 0.387 | 0.387 |
| 3 | Ethylene diamine | 0.43 | 0.86 |
| | Hexanoic acid | 0.387 | 0.387 |
| | 12-Hydroxystearic acid | 0.473 | 0.473 |
| 4 | Ethylene diamine | 0.6 | 0.12 |
| | Hexanoic acid | 0.84 | 0.84 |
| | 12-Hydroxystearic acid | 0.36 | 0.36 |
| 5 | Ethylene diamine | 0.7 | 1.4 |
| | Hexanoic acid | 1.05 | 1.05 |
| | 12-Hydroxystearic acid | 0.35 | 0.35 |
| 6 | Ethylene diamine | 0.7 | 1.4 |
| | Hexanoic acid | 1.12 | 1.12 |
| | 12-Hydroxystearic acid | 0.28 | 0.28 |
| 7 | Ethylene diamine | 0.75 | 1.5 |
| | Hexanoic acid | 1.275 | 1.275 |
| | 12-Hydroxystearic acid | 0.225 | 0.225 |
| 8 | Ethylene diamine | 0.5 | 1.0 |
| | Hexanoic acid | 0.4 | 0.4 |
| | 12-Hydroxystearic acid | 0.6 | 0.6 |
| 9 | Ethylene diamine | 0.4 | 0.8 |
| | Hexanoic acid | 0.28 | 0.28 |
| | 12-Hydroxystearic acid | 0.52 | 0.52 |
| 10 | Ethylene diamine | 0.4 | 0.8 |
| | Hexanoic acid | 0.24 | 0.24 |
| | 12-Hydroxystearic acid | 0.56 | 0.56 |
| 11 | Ethylene diamine | 0.4 | 0.8 |
| | Hexanoic acid | 0.2 | 0.2 |
| | 12-Hydroxystearic acid | 0.6 | 0.6 |
| 12 | Ethylene diamine | 0.35 | 0.70 |
| | Hexanoic acid | 0.14 | 0.14 |
| | 12-Hydroxystearic acid | 0.56 | 0.56 |
| 13 | Ethylene diamine | 0.43 | 0.86 |
| | Heptanoic acid | 0.43 | 0.43 |
| | 12-Hydroxystearic acid | 0.43 | 0.43 |
| 14 | Ethylene diamine | 0.44 | 0.88 |
| | Heptanoic acid | 0.484 | 0.484 |
| | 12-Hydroxystearic acid | 0.396 | 0.396 |
| 15 | Ethylene diamine | 0.43 | 0.86 |
| | Heptanoic acid | 0.387 | 0.387 |
| | 12-Hydroxystearic acid | 0.473 | 0.473 |
| 16 | Ethylene diamine | 0.5 | 1.0 |
| | Heptanoic acid | 0.6 | 0.6 |
| | 12-Hydroxystearic acid | 0.4 | 0.4 |
| 17 | Ethylene diamine | 0.5 | 1.0 |
| | Heptanoic acid | 0.4 | 0.4 |
| | 12-Hydroxystearic acid | 0.5 | 0.6 |
| 18 | Ethylene diamine | 0.5 | 1.0 |
| | Heptanoic acid | 0.55 | 0.55 |
| | 12-Hydroxystearic acid | 0.45 | 0.45 |
| 19 | Ethylene diamine | 0.5 | 1.0 |
| | Heptanoic acid | 0.45 | 0.45 |
| | 12-Hydroxystearic acid | 0.55 | 0.55 |
| 20 | Ethylene diamine | 0.6 | 1.2 |
| | Heptanoic acid | 0.84 | 0.84 |
| | 12-Hydroxystearic acid | 0.36 | 0.36 |
| 21 | Ethylene diamine | 0.5 | 1.0 |
| | Heptanoic acid | 0.3 | 0.3 |
| | 12-Hydroxystearic acid | 0.7 | 0.7 |
| 22 | Ethylene diamine | 0.6 | 1.2 |
| | Heptanoic acid | 0.9 | 0.9 |
| | 12-Hydroxystearic acid | 0.3 | 0.3 |
| 23 | Ethylene diamine | 0.7 | 1.4 |
| | Heptanoic acid | 1.12 | 1.12 |
| | 12-Hydroxystearic acid | 0.28 | 0.28 |
| 24 | Ethylene diamine | 0.7 | 1.4 |
| | Heptanoic acid | 1.19 | 1.19 |
| | 12-Hydroxystearic acid | 0.21 | 0.21 |
| 25 | Ethylene diamine | 0.7 | 1.4 |
| | Heptanoic acid | 1.26 | 1.26 |
| | 12-Hydroxystearic acid | 0.14 | 0.14 |
| 26 | Ethylene diamine | 0.7 | 1.4 |
| | Heptanoic acid | 1.085 | 1.085 |
| | 12-Hydroxystearic acid | 0.315 | 0.315 |

TABLE 1-continued

| Example | Reagents | Moles | Equivalents |
|---|---|---|---|
| 27 | Ethylene diamine | 0.45 | 0.90 |
| | Butyric acid | 0.45 | 0.45 |
| | 12-Hydroxystearic acid | 0.45 | 0.45 |
| 28 | Ethylene diamine | 0.45 | 0.90 |
| | Pentanoic acid | 0.45 | 0.45 |
| | 12-Hydroxystearic acid | 0.45 | 0.45 |
| 29 | Ethylene diamine | 0.43 | 0.86 |
| | Octanoic acid | 0.43 | 0.43 |
| | 12-Hydroxystearic acid | 0.43 | 0.43 |
| 30 | Hexane diamine | 0.5 | 1.0 |
| | Hexanoic acid | 0.5 | 0.5 |
| | 12-Hydroxystearic acid | 0.5 | 0.5 |
| 31 | m-Xylylene Diamine | 0.45 | 0.90 |
| | Hexanoic acid | 0.45 | 0.45 |
| | 12-Hydroxystearic acid | 0.45 | 0.45 |

EVALUATION OF RHEOLOGICAL ADDITIVES

Test One

All the materials prepared according to Examples 1–31 were incorporated by dispersing into a long oil alkyd baking enamel paint system at a loading of 7.2 pounds per hundred gallons (pphg) and a number of tests were conducted to demonstrate the effectiveness of the respective rheological additive as to common rheological properties of the type shown below.

After the paints were made, they were allowed to equilibrate at room temperature overnight, and the paint properties were measured as described below:

(1) Fineness of grind (indicative of dispersibility) was measured in Hegman units using a wide path Hegman gauge in accordance with ASTM D1210-79.

(2) Brookfield viscosities at 10 and 100 RPM were measured with a Brookfield Model RVT viscometer in accordance with ASTM D2196-81. From viscosity data, a Thixotropic Index (TI) was calculated as follows:

$$\text{Thixotropic Index (TI)}=10\text{ RPM Viscosity}+100\text{ RPM Viscosity}$$

(3) Sag resistance was measured in mils using a Leneta Sag multi notch applicator at room temperature in accordance with ASTM D4400-84.

(4) In some instances Stormer viscosities were measured in Krebs Units (KU) with a Thomas Stormer Instrument, Model #09730-G15, in accordance with ASTM D562-81.

Gloss measurements were measured at 60° and/or 20° in accordance with ASTM D523-80. Drawdowns were prepared of paints according to Formulation A, and the 60° and/or 20° gloss determined after curing the film for 24 hours at room temperature. The preparation and components of the long oil alkyd baking enamel paint system are described in Formulation A. The results are set forth in Table 2.

Additionally, samples of rheological additives of the present invention were evaluated for Brookfield viscosities and intercoat adhesion in a two-pack epoxy primer. The preparation and components of the epoxy primer two component paint system are described in Formulation B. The results of the tests in a two-pack epoxy primer are set forth in Table 3. PVC topcoat formulation used for intercoat adhesion test is described in Formulation C. The intercoat adhesion test method and the spray conditions are described below.

The results of the intercoat adhesion in the two-pack epoxy primer are set forth in Table 4. The spray conditions used for intercoat adhesion test are set forth in Table 5.

Additionally, the samples of the rheological additives of the invention were evaluated in an air drying short oil alkyd paint system. The preparation and components of the short oil alkyd paint system are described in Formulation D. The results are set forth in Table 6.

In order to compare the rheological properties of the inventive additives with common prior art additives, several comparative examples were made and tested.

Comparative Example 1

A long oil alkyd enamel paint was prepared according to the procedure described in Formulation A to which was added a rheological additive designated as Comparative X which uses the chemistry described above. The paint properties were evaluated and set forth in Table 2.

Comparative Example 2

A two-pack epoxy primer was prepared according to the procedure described in Formulation B without a rheological additive. The intercoat adhesion properties were evaluated and are set forth in Table 4.

Comparative Example 3

A two-pack epoxy primer was prepared according to the procedure described in Formulation B with Comparative X rheological additive. The paint properties were evaluated and are set forth in Table 3 and intercoat adhesion properties were evaluated and set forth in Table 4.

Comparative Example 4

An air drying short oil alkyd paint was prepared according to the procedure described in Formulation D without a rheological additive. The paint properties were evaluated and set forth in Table 6.

Comparative Example 5

An air drying short oil alkyd enamel paint was prepared according to the procedure described in Formulation D with Comparative X rheological additive. The paint properties were evaluated and set forth in Table 6.

FORMULATION A
LONG OIL ALKYD BAKING ENAMEL PAINT

| Component | Function | Pounds | Gallons |
|---|---|---|---|
| Beckosol 10-060 | Alkyd binder, Reichhold Chemicals | 105.76 | 13.22 |
| Mineral Spirits 66/3 | Solvent | 70.60 | 10.91 |
| Rheological additive | Rheological additive | 7.20 | 0.51 |
| Mix 3 minutes @ 3000 RPM, then add | | | |
| Methanol 95/5 | Solvent | 2.38 | 0.35 |
| Mix 2 minutes # 3000 RPM, then add | | | |
| KRONOS 2101 | Titanium dioxide | 325.00 | 9.37 |
| Disperse 15 minutes @ 5000 RPM | | | |

-continued

FORMULATION A
LONG OIL ALKYD BAKING ENAMEL PAINT

| Component | Function | Pounds | Gallons |
|---|---|---|---|
| Let down: | | | |
| Beckosol 10-060 | Alkyd binder, Reichhold Chemicals | 445.90 | 55.74 |
| Mineral Spirits 66/3 | Solvent | 54.70 | 8.45 |
| 6% Zirconium Nuxtra | Drier, Hüls | 5.40 | 0.75 |
| 6% Calcium Nuxtra | Drier, Hüls | 4.00 | 0.51 |
| 6% Cobalt Nuxtra | Drier, Hüls | 5.22 | 0.70 |
| Exkin #2 | Antiskinning agent, Hüls | 1.10 | 0.14 |
| Mix 10 minutes @ low speed | | | |
| | | 1027.26 | 100.65 |

TABLE 2

Results in a long oil alkyd baking enamel paint system
Rheological additive: 7.2 pphg

| Example | Stormer Viscosity, KU | Brookfield viscosity, cP 10/100 rpm | T.I. | Leneta Sag (mils) | Gloss, 60° |
|---|---|---|---|---|---|
| Comparative X | 97 | 4800/1920 | 2.50 | 13 | 85 |
| Inventive Example 1 | 100.8 | 4640/2156 | 2.15 | 11 | 84 |
| Inventive Example 4 | 95 | 4200/1652 | 2.54 | 11.4 | 83 |
| Inventive Example 5 | 101 | 6480/2084 | 3.11 | 15 | 86 |
| Inventive Example 6 | 98 | 5320/1876 | 2.84 | 13.6 | 87 |
| Inventive Example 7 | 92 | 3440/1472 | 2.34 | 8 | 82 |
| Inventive Example 8 | 95.7 | 3000/1692 | 1.77 | 6.9 | 85 |
| Inventive Example 9 | 92.7 | 2160/1424 | 1.52 | 5.9 | 85 |
| Inventive Example 10 | 90.6 | 1680/1276 | 1.32 | 4.8 | 84 |
| Inventive Example 11 | 88.7 | 1280.1136 | 1.13 | 3.8 | 84 |
| Inventive Example 12 | 88.2 | 1160/1076 | 1.08 | 3.7 | 88 |
| Inventive Example 17 | 89 | 2200/1212 | 1.82 | 5 | 80 |
| Inventive Example 18 | 95 | 4080/1600 | 2.55 | 11 | 79 |
| Inventive Example 19 | 84 | 1320/956 | 1.38 | 4 | 81 |
| Inventive Example 20 | 104 | 7840/2260 | 3.47 | 15 | 79 |
| Inventive Example 21 | 91 | 2520/1360 | 1.85 | 6 | 79 |
| Inventive Example 22 | 106 | 9680/2632 | 3.68 | 18 | 84 |
| Inventive Example 23 | 105 | 9440/2631 | 3.59 | 17 | 85 |
| Inventive Example 24 | 100 | 6160/2080 | 2.96 | 12 | 80 |
| Inventive Example 25 | 103 | 7289/2232 | 3.26 | 14 | 80 |
| Inventive Example 26 | 107.4 | 9840/2692 | 3.65 | 20 | 85 |
| Inventive Example 27 | 92 | 2520/1444 | 1.75 | 6 | 84 |

TABLE 2-continued

| Results in a long oil alkyd baking enamel paint system Rheological additive: 7.2 pphg | | | | | |
|---|---|---|---|---|---|
| Example | Stormer Viscosity, KU | Brookfield viscosity, cP 10/100 rpm | T.I. | Leneta Sag (mils) | Gloss, 60° |
| Inventive Example 28 | 98.9 | 3326/1884 | 1.76 | 7 | 81 |
| Inventive Example 30 | 89 | 2320/1348 | 1.72 | 5 | 81 |
| Inventive Example 31 | 93 | 2240/1444 | 1.55 | 4.4 | 81 |

Discussion of Results: As may be seen from the data set forth above, the rheological additives of the present invention as described in the Inventive Examples are effective Theological additives providing excellent properties of high viscosity, anti-sagging and high thixotropic index and maintaining good gloss.

FORMULATION B
TWO PACK EPOXY-POLYAMIDE PRIMER

| Component | Function | Weight |
|---|---|---|
| Epikote 1001/75X | Binder, Shell Chemicals Europe | 19.85 |
| Antiterm U | Wetting agent, Byk Chemie | 0.20 |
| | Rheological agent | 0.50 |
| Methyl Isobutyl Ketone | Solvent | 6.96 |
| Xylene | Solvent | 13.94 |
| n-Butanol | Solvent | 3.98 |
| KRONOS 2059 | Titanium dioxide, KRONOS Titan | 6.96 |
| Blank Fixe micro | Filler, Sachtleben Chemie | 35.65 |
| Talkum IT extra | Filler, Grolman GmbH | 11.96 |
| | | 100.00 |
| Component A | Disperse for 30 minutes. 18 m/s, 50° C. | |
| Component B | | |
| Versamid 115X70 | Hardener | 31.00 |
| Component A + B | Slow stirring for 5 minutes | |
| | | 131.00 |

FORMULATION C
PVC TOPCOAT

| Component | Function | Weight % |
|---|---|---|
| Laroflex MP 35 | PVC-binder, BASF (35% in xylene) | 34.75 |
| Xylene | Solvent | 3.84 |
| BENTONE 38 | Rheological additive, Elementis Specialties | 0.80 |
| | Disperse for 5 minutes at 18 m/s tooth blade | |
| KRONOS 2310 | Titanium dioxide, KRONOS Titan GmbH | 30.35 |
| | Disperse for 20 minutes 18 m/s tooth blade | |
| Laroflex MP 35 | PVC-binder, BASF (35% in xylene) | 21.26 |
| Chloroparaffin 50 | Plasticizer | 2.68 |
| Shellsol A | Solvent | 6.32 |
| | | 100.00 |

TABLE 3

| Results in a two pack epoxy primer Rheological additive: 0.5% | | | | | |
|---|---|---|---|---|---|
| | Brookfield RVT viscosities (mPa s) after 1 day rpm | | | | |
| Example | 10 | 20 | 50 | 100 | T.I. |
| Comparative Example 3 | 26000 | 14000 | 7000 | 4000 | 6.50 |
| Inventive Example 1 | 29500 | 16500 | 7600 | 4400 | 6.70 |
| Inventive Example 4 | 34000 | 19000 | 8500 | 4800 | 7.08 |
| Inventive Example 5 | 34000 | 18500 | 8000 | 4700 | 7.23 |
| Inventive Example 6 | 19000 | 10500 | 5300 | 3200 | 5.94 |
| Inventive Example 7 | 37000 | 20000 | 9200 | 5100 | 7.25 |

Discussion of Results: As can be seen from the data set forth above, the additives of the present invention are effective paint additives yielding excellent viscosity results and thixotropic index in the two pack epoxy primer.

Tests 2 and 3

One important aspect of this invention is to match prior art compositions in paint properties without affecting intercoat adhesion properties. Prior art compositions show poor intercoat adhesion whereas the inventive example exhibits no intercoat adhesion failures.

Test 2 and 3 were run to show the improved intercoat adhesion properties of this invention. It used the below-described method.

INTERCOAT ADHESION TEST METHOD

1. Equipment and system

| | |
|---|---|
| Test system: | 2 part epoxy primer<br>2 part epoxy primer, commercial system |
| Top coat: | 2 part epoxy primer<br>PVC top coat<br>PVC top coat, commercial system |
| Spraying equipment: | Pneumatic |
| Spraying conditions: | Spray nozzle with 1.2 mm<br>Pressure 4-5 bar |
| Spraying viscosity: | 40 s, DIN 4 cup |
| Substrate: | Steel panel, 30 × 20 cm |

2. Conditions

| | |
|---|---|
| Application and storage temperatures: | 10° C., room temperature, 40° C. |
| Primer applied: | 1 and 3 spray passes |
| Top coat: | 1 and 3 spray passes |

3. Method

1. Application of the primer under the above-mentioned conditions with 1 and 3 spray passes.
2. Evaporation of solvents is controlled by covering areas of the sprayed surface directly after the last spray pass, for example with a watch glass or laboratory weight dish. Subsequently and depending on temperature, other areas of the coating are also covered to inhibit solvent evaporation.
3. The primed panels are left to dry for the necessary time at each temperature.
4. The topcoat is then applied under the above conditions also with 1 and 3 spray passes.
5. The panels are then stored at room temperature until dry.
6. Tests by cross hatch and tape method.

Test 2

TABLE 4

Results of intercoat adhesion in the two-pack epoxy primer after 1 week storage, second recoating.

| | | 5° C. | | | | 23° C. | | | | 40° C. | | | |
|---|---|---|---|---|---|---|---|---|---|---|---|---|---|
| | | 1 spray pass | | 3 spray passes | | 1 spray passes | | 3 spray pass | | 1 spray passes | | 3 spray pass | |
| Example | | GT | TT | GT | TT | GT | TT | GT | TT | GT | TT | GT | TT |
| Comparative | 1. tin lid | 0 | 0 | 0 | 1 | 0 | 0 | 0 | 0 | 0 | 0 | 0 | 0 |
| Example 2 | 2. tin lid | 0 | 0 | 0 | 0 | 0 | 0 | 0 | 0 | 0 | 0 | 0 | 0 |
| | 3. tin lid | 0 | 0 | 1 | 0 | 0 | 0 | 0 | 0 | 0 | 0 | 0 | 0 |
| Comparative | 1. tin lid | 5 | 5 | 3 | 5 | 5 | 5 | 5 | 5 | 5 | 5 | 5 | 5 |
| Example 3 | 2. tin lid | 0 | 0 | 0 | 0 | 1 | 0 | 0 | 0 | 1 | 0 | 0 | 0 |
| | 3. tin lid | 1 | 0 | 0 | 0 | 0 | 0 | 0 | 0 | 1 | 0 | 0 | 0 |
| Inventive | 1. tin lid | 1 | 0 | 0 | 0 | 0 | 0 | 0 | 0 | 1 | 0 | 0 | 0 |
| Example 1 | 2. tin lid | 1 | 0 | 0 | 0 | 0 | 0 | 0 | 0 | 1 | 0 | 0 | 0 |
| | 3. tin lid | 1 | 0 | 0 | 0 | 0 | 0 | 0 | 0 | 1 | 0 | 1 | 0 |

GT (cross hatch):
0 = Good, the cutting lines are totally smooth. No part of the coating is flaked off.
1 = At the cutting intersections about 5% of the surface of the coating is flaked off.
2 = At the cutting lines and at the cutting intersections about 15% of the coating is flaked off.
3 = About 35% of the coating is in small of big stripes flaked off.
4 = At the cutting lines about 65% of the coating is flaked off.
5 = More that 65% of the coating is flaked off.
TT (tape test): 0 = good/5 = poor, coat is totally peeled off.

Discussion of Results: As can be seen from the data set forth above, the rheological additive of the present invention shows no intercoat adhesion failures using the cross hatch test as compared with the Comparative Example 3 where Comparative X was used and are equal to the Comparative Example 2 where no rheological additive at all was added to the primer formulation. In the tape test, the rheological additive of the present invention shows excellent intercoat adhesion properties as compared to the Comparative Example 2.

Test 3

TABLE 5

| | Spray Conditions | | |
|---|---|---|---|
| | 5° C. | 23° C. | 40° C. |
| 1. tin lid putting on | direct | direct | direct |
| 2. tin lid putting on | After 3-4 hours | After 2 hours | After ½ hour |
| 3. tin lid putting on | After 6-8 hours | After 4 hours | After 1½ hour |
| First recoating after | 72 hours | 48 hours | 24 hours |
| Second recoating after | 1 week | 1 week | 1 week |

Panels were cured at 5°, 23°or 40° C. before overcoating (spraying at room temperature). Also the primer and the substrate were temperature controlled before the first spraying and the first recoating. Spray pressure: 4–5 bar, spray nozzle: 1.2 mm

FORMULATION D
SHORT OIL AIR DRYING ALKYD SYSTEM

| Component | Function | Weight % |
|---|---|---|
| Mill-base: | | |
| Jägalyd FS 48, 55% | Alkyd binder | 15.00 |
| K21 (white spirit) | Solvent | 2.00 |
| Xylene | Solvent | 2.00 |
| Rheological additive | Rheological additive | 1.00 |
| Predisperse at 16 m/s (4 cm tooth blade) for 5 minutes | | |
| Sojalecithin STA | Wetting agent | 0.40 |
| KRONOS 2190 | Titanium dioxide | 24.50 |
| Disperse at 18 m/s for 30 minutes (temperature is controlled) | | |
| Let down: | | |
| Jägalyd FS 48, 55% | Alkyd binder | 48.00 |
| Exkin 2 | Anti-skinning agent | 0.20 |
| Byk 301 | Scratch resistance additive | 0.40 |
| Jäger drier 3.3 | Drier | 2.00 |
| K21 | Solvent | 2.50 |
| Xylene | Solvent | 2.00 |
| Mix at low speed for 5 minutes | | |
| | | 100.00 |

TABLE 6

Results in an air drying short oil alkyd paint
Rheological additive: 1.0%

| | Brookfield RVT viscosities (mPa s) after 1 day rpm | | | | Hegman Grind | Sag (mm) 4 mm groove, | |
|---|---|---|---|---|---|---|---|
| Example | 10 | 20 | 50 | 100 | after 30 min. | length of runners | T.I. |
| Comparative Example 4 | 1200 | 1200 | 1160 | 1140 | 7.0A | 132 | 1.05 |

TABLE 6-continued

| | Results in an air drying short oil alkyd paint Rheological additive: 1.0% | | | | | | |
|---|---|---|---|---|---|---|---|
| | Brookfield RVT viscosities (mPa s) after 1 day rpm | | | | Hegman Grind | Sag (mm) 4 mm groove, | |
| Example | 10 | 20 | 50 | 100 | after 30 min. | length of runners | T.I. |
| Comparative Example 5* | 6400 | 4800 | 3320 | 2600 | 7.0A | 17 | 2.46 |
| Inventive Example 1* | 6000 | 4600 | 3200 | 2580 | 6.5B | 20 | 2.33 |
| Inventive Example 4* | 7200 | 5200 | 3480 | 2680 | 2.5B | 16 | 2.69 |
| Inventive Example 5* | 5200 | 4000 | 2960 | 2400 | 3.5B | 22 | 2.17 |
| Inventive Example 6* | 4400 | 3600 | 2800 | 2320 | 2.0B | 24 | 1.90 |
| Inventive Example 7* | 5400 | 4200 | 2960 | 2400 | 2.0B | 21 | 2.25 |
| Inventive Example 13 | 7000 | 6750 | 6000 | 5500 | 6.5B | 116† | 1.27 |
| Inventive Example 20 | 8000 | 6750 | 5500 | 4900 | 4.5B | 76† | 1.63 |
| Inventive Example 22 | 11500 | 9250 | 7000 | 6000 | 3.0B | 37† | 1.92 |
| Inventive Example 23 | 13000 | 11000 | 8200 | 6750 | 4.0B | 28† | 1.93 |
| Inventive Example 24 | 16500 | 12500 | 9200 | 7550 | 6.5B | 8† | 2.19 |

*Values after diluted with 5% xylene
†Sag 6 mm groove

Discussion of Results: As may be seen from the data set forth above, the rheological additives of the present invention show high viscosity increase and excellent anti-sagging properties as compared to the comparative example containing no rheological additive. The inventive additives show comparable viscosity increase and anti-sag properties as compared to the comparative Example 5.

SUMMARY OF THE PRECEDING EXAMPLES AND TESTS

The above results demonstrate the ability of the current invention to make paint and coating products without affecting intercoat adhesion as compared with prior art Comparative X. The above results also demonstrate that making the product in this manner does not detract from its effectiveness in thickening an organic based paint.

In this regard, the inventive rheological additives of this invention do not adversely affect intercoat adhesion properties of topcoats, which are subsequently applied to primers. The rheological additives of the present invention also provide acceptable and adequate increases in viscosity, improved sag resistance and suspending properties when incorporated in various coating systems.

The foregoing description and examples have been set forth merely to illustrate the invention and are not intended to be limiting. Since modifications of the disclosed embodiments incorporating the spirit of the invention may occur to persons skilled in the art, the invention should be construed to include everything within the scope of the appended claims and equivalents thereof.

We claim:

[1. A rheological additive consisting of the reaction product of:

a) a diamine selected from the group consisting of ethylene diamine and hexamethylene diamine;

b) one or more straight chain monocarboxylic acids selected for the group consisting of pentanoic acid, hexanoic acid, heptanoic acid and octanoic acid; and c) 12-hydroxystearic acid.]

[2. The rheological additive of claim 1 wherein the reaction product comprises:

a) 2 equivalents of said diamine;

b) from 0.4 to 1.8 equivalents of one or more of said straight chain monocarboxylic acids having 3 to 7 carbon atoms in the straight chain saturated aliphatic hydrocarbon radical; and c) from 1.6 to 0.2 equivalents of 12-hydroxystearic acid.]

[3. The rheological additive of claim 2 wherein the reaction product comprises:

a) 2 equivalents of ethylene diamine;

b) from 0.4 to 1.6 equivalents of one or more of said straight chain monocarboxylic acids having 3 to 7 carbon atoms in the straight chain saturated aliphatic hydrocarbon radical; and c) from 1.6 to 0.2 equivalents of 12-hydroxystearic acid.]

[4. A paint or coating composition with improved intercoat adhesion containing the rheological additive of claim 1.]

[5. A paint or coating composition with improved intercoat adhesion containing the rheological additive of claim 2.]

[6. A paint or coating composition with improved intercoat adhesion containing the rheological additive of claim 3.]

[7. The composition of claim 4 where the paint or coating composition is selected from the group consisting of alkyd enamel paints, air drying alkyd paints, long oil alkyd baking paints, two-pack epoxy polyamide primer paints and pvc topcoats.]

*8. A method of use for a rheological additive, said rheological additive consisting of the reaction product of:*

(*a*) *a diamine selected from the group consisting of ethylene diamine and hexamethylene diamine;*

(*b*) *one or more straight chain monocarboxylic acids selected from the group consisting of pentanoic acid, hexanoic acid, heptanoic acid and octanoic acid; and*

(*c*) *12-hydroxystearic acid,*

*said method comprising:*

*adding the rheological additive to a pain or coating composition, and*

*applying multiple layers of the composition with the added rheological additive to a surface, whereby a subsequently applied layer of paint or coating composition adheres to the layer with the added rheological additive.*

*9. A method of use according to claim 8, wherein the reaction product comprises:*

(*a*) *2 equivalents of ethylene diamine;*

(*b*) *from 0.4 to 1.8 equivalents of one or more of said straight chain monocarboxylic acids having 3 to 7 carbon atoms in the straight chain saturated aliphatic hydrocarbon radical; and*

(*c*) *from 1.6 to 0.2 equivalents of 12-hydroxystearic acid.*

*10. A method of use according to claim 9, wherein the reaction product comprises:*

(*a*) *2 equivalents of ethylene diamine;*

(*b*) *from 0.4 to 1.6 equivalents of one or more of said straight chain monocarboxylic acids having 3 to 7 carbon atoms in the straight chain saturated aliphatic hydrocarbon radical; and*

(*c*) *from 1.6 to 0.2 equivalents of 12-hydroxystearic acid.*

*11. A method of use according to claim 8, wherein each composition is selected from the group consisting of alkyd enamel paints, air drying alkyd paints, long oil alkyd baking paints, two-pack epoxy polyamide primer paints and pvc topcoats.*

* * * * *